United States Patent

Remboski et al.

[11] Patent Number: 5,839,274
[45] Date of Patent: Nov. 24, 1998

[54] METHOD FOR MONITORING THE PERFORMANCE OF A CATALYTIC CONVERTER USING POST CATALYST METHANE MEASUREMENTS

[75] Inventors: Donald J. Remboski; Jeffrey D. Naber, both of Dearborn; Darren A. Schumacher, Ypsilanti, all of Mich.

[73] Assignee: Motorola, Inc., Schaumburg, Ill.

[21] Appl. No.: 837,629

[22] Filed: Apr. 21, 1997

[51] Int. Cl.⁶ .......................................... F01N 3/00
[52] U.S. Cl. ................ 60/274; 60/276; 60/277; 60/285
[58] Field of Search ............... 60/274, 276, 277, 60/285

[56] References Cited

U.S. PATENT DOCUMENTS

5,131,224  7/1992  Siewert et al. .................... 60/274
5,408,215  4/1995  Hamburg .
5,452,576  9/1995  Hamburg et al. .
5,524,432  6/1996  Hansel ............................. 60/285

Primary Examiner—Thomas E. Denion
Attorney, Agent, or Firm—Jasper W. Dockrey

[57] ABSTRACT

A method for monitoring and controlling the performance of a catalytic converter (34) includes monitoring an exhaust gas stream from an engine (16) for the presence of methane. Upon detecting methane in the exhaust gas stream an oxygen storage level of a catalyst within the catalytic converter (34) is determined. The oxygen storage level is compared with a reference standard and the air/fuel ratio of the exhaust gas stream is continuously adjusted to maintain the oxygen storage level within predetermined control limits.

15 Claims, 6 Drawing Sheets

METHOD FOR MONITORING THE PERFORMANCE OF A CATALYTIC CONVERTER USING POST CATALYST METHANE MEASUREMENTS

FIELD OF THE INVENTION

This invention relates, in general, to internal combustion engine exhaust gas control systems and methods of operation, and more particularly, to control systems and methods for monitoring and controlling the performance of a catalytic converter based on exhaust gas methane measurements.

BACKGROUND OF THE INVENTION

Many environmental pollution laws currently in effect in the United States, and many foreign countries, require that exhaust emissions be reduced to levels previously thought unobtainable by the automotive industry. A key element of exhaust gas emission reduction systems is the catalytic converter, which in current automotive applications is used to simultaneously reduce the levels of carbon monoxide, oxides of nitrogen, and unburned hydrocarbons in the exhaust. Catalytic converters, however, are extremely expensive, because their pollutant reducing capabilities depend on the presence of one or more precious metals in the catalyst formulation (e.g. palladium).

A catalytic converter reduces the level of exhaust gas emissions by reducing oxides of Nitrogen (referred to collectively as NOx) and oxidizing Carbon Monoxide (CO) and various hydrocarbons (HC). The mechanism by which NOx is reduced and CO and HC oxidized is related to the precious metal sites within the catalyst. These precious metal sites act as oxygen storage receptacles. The catalyst reduces NOx by stripping Oxygen away from NOx compounds and oxidizes HC and CO with stored oxygen.

In order to maintain catalytic converter performance during normal operation, exhaust gas sensors are used to maintain a stoichiometric mixture in the exhaust stream. Most fuel systems presently in use employ a heated-exhaust-gas-oxygen (HEGO) sensor in front of the catalyst. The HEGO sensor provides a high voltage if the exhaust gas in rich of stoichiometry and a low voltage if the exhaust gas is lean of stoichiometry. The switching behavior of the HEGO sensor can be used in a feedback control system that is characterized by a limit cycle about stoichiometry (often referred to as the 'ramp-up jump-down' characteristic. In other applications (which are becoming more common), an additional HEGO sensor is placed aft of the catalyst and provides information used to adjust for the effects of aging in the forward sensor.

Current regulations also require that the performance of the catalytic converter be monitored using an On-Board Diagnostic (OBD). These regulations require that the vehicle control system detect degradation in catalyst conversion efficiencies, and that if catalyst conversion efficiencies fall below a level defined in the regulation, a Malfunction Indicator Light (MIL) must be activated so that the vehicle operator can be informed of the malfunction and the vehicle taken in for maintenance. Failure to comply with this regulation will result in higher fleet emissions and severe economic penalties for the vehicle manufacturer.

The switching ratio of the upstream and downstream HEGO sensors can be used as a crude estimate of the activity of the catalyst (see, for example, "Detection of Catalyst Performance Loss Using On-Board Diagnostics," W. Clemmens et al., Society of Automotive Engineers, Detroit Michigan, 1990, paper 900062). Although HEGO sensors are reliable and can function in the high-temperature, corrosive environment of an exhaust gas system, the switch ratio technique for catalyst monitoring has poor resolution and only provides an ability to determine gross changes in the catalyst conversion efficiency. Additionally, the switch ratio technique requires recalibration when there are system changes in the engine or the catalyst. The monitoring of hydrocarbon conversion efficiencies is particularly problematic.

Prior methods for monitoring catalyst conversion efficiencies can exhibit a slow system response. In one method, the measurement required to be input into the emissions controller is a measurement of the amount of pollutants passing through the catalyst (see, for example, U.S. Pat. No. 5,452,576 to Hamburg, et al.). In this system the controller has a low bandwidth due to the large transport delays in the system. The system delay makes the controller sluggish, such that large deviations from the control objective are necessary before the controller initiates a correction. Accordingly, a need existed for a more reliable and responsive method for monitoring and maintaining catalytic converter performance.

BRIEF DESCRIPTION OF THE DRAWINGS

FIG. 1$a$ is a plot of $\lambda$ versus time;

FIG. 1$b$ is a plot of post catalyst exhaust gases versus time;

DETAILED DESCRIPTION OF PREFERRED EMBODIMENTS

Automotive exhaust gas catalysts have the ability to store (adsorb) and release (desorb) oxygen, carbon monoxide, and hydrocarbon molecules. This storage capability allows the catalyst to absorb short, rapid deviations to rich or lean air/fuel mixtures without loss of conversion efficiency. However, the catalyst has a finite storage capacity for oxygen and exceeding the oxygen saturation level of the catalyst rapidly degrades the catalyst's ability to reduce, for example, various nitrogen oxides. Similarly, the catalyst uses stored oxygen to oxidize carbon monoxide and hydrocarbons, when the air/fuel mixture is temporarily rich. Accordingly, depleting the catalyst of its stored oxygen rapidly reduces the catalyst's ability to, for example, convert carbon monoxide into carbon dioxide.

For purposes of definition, as used herein, $\lambda$ is equal to the air-fuel ratio (AFR) divided by the stoichiometric air-fuel ratio (AFRS). A value of $\lambda$ less than one indicates a rich condition indicating the exhaust gas contains a high fuel concentration (fuel in excess of a stoichiometric air/fuel ratio). Correspondingly, for values of λ greater than one, a lean condition occurs indicating the exhaust gas contains a low fuel concentration and a high oxygen concentration. Those skilled in the art will appreciate that the computation of λ can be carried out by engine control unit upon receiving input from various kinds of exhaust gas sensors.

Figure 1A:
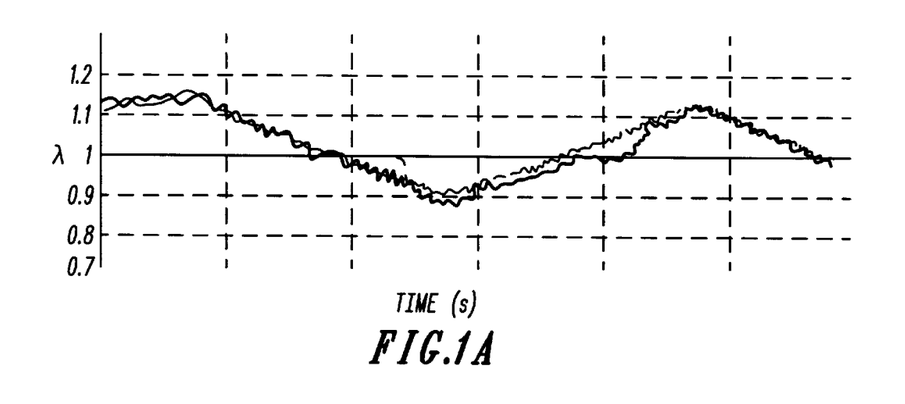
Figure 1B:
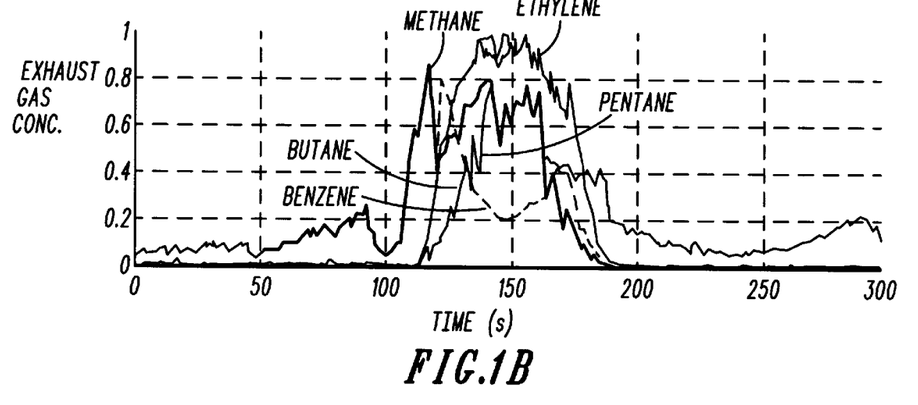

The problem of predicting catalyst oxygen depletion without causing a breakthrough is solved by observing exhaust gas methane concentration. As shown in FIGS. 1a and 1b, a rise in post-catalyst methane concentration is a leading indicator of a non-methane hydrocarbon breakthrough. FIGS. 1a and 1b are correlated to the same time interval. As illustrated in FIG. 1a, as the pre-catalyst gas goes from lean ($\lambda>1$) to rich ($\lambda<1$), the post-catalyst gas remains at $\lambda=1$ for a finite amount of time. The length of the time interval is a function of the catalyst oxygen storage capacity and the flow rate of oxygen into the catalyst. The delay between the time that the post catalyst AFR holds at stoichiometric and the time that it returns to the precatalyst AFR is a result of oxygen being released from or stored in the catalyst.

As shown by comparing FIGS. 1a and 1b, the post-catalyst concentration of the non-methane hydrocarbons increases at the same time as the catalyst oxygen depletes (pre-catalyst and post-catalyst AFR match). Significantly, as shown in FIG. 1b, the post-catalyst methane concentration increases a short time before the catalyst oxygen depletes, because of its lower reactivity. Thus, the post-catalyst methane concentration serves as a leading indicator of catalyst oxygen depletion and impending breakthrough of non-methane hydrocarbons and carbon monoxide.

Note that methane is currently an unregulated exhaust gas hydrocarbon. Thus, using methane as a leading indicator of non-methane hydrocarbon breakthrough allows one to avoid hydrocarbon breakthroughs with no regulated emissions penalty. Furthermore, by monitoring the methane concentration, the breakthroughs associated with both catalyst monitoring and transient AFR controller errors can be eliminated. This improves the emissions performance and durability of the system while reducing required catalyst volume and hence system cost.

Furthermore, as shown in FIG. 1b, for high conversion efficiencies, (i.e. for exhaust gas passing through an active catalyst) the post catalyst hydrocarbons are separated by reactivity and reach a hydrocarbon/methane sensor as a series of hydrocarbon waves. That is, for certain initial conditions, a non-methane hydrocarbon sensor and a methane sensor will spike at an interval that is a function of the conversion efficiency of the catalyst (i.e. the phase shift in the two signals is a function of hydrocarbon conversion efficiency). Given a proper set of initial conditions, this empirical measurement between hydrocarbon phase shift and hydrocarbon conversion efficiency gives sufficient information for a non-intrusive catalyst monitor.

Figure 2:
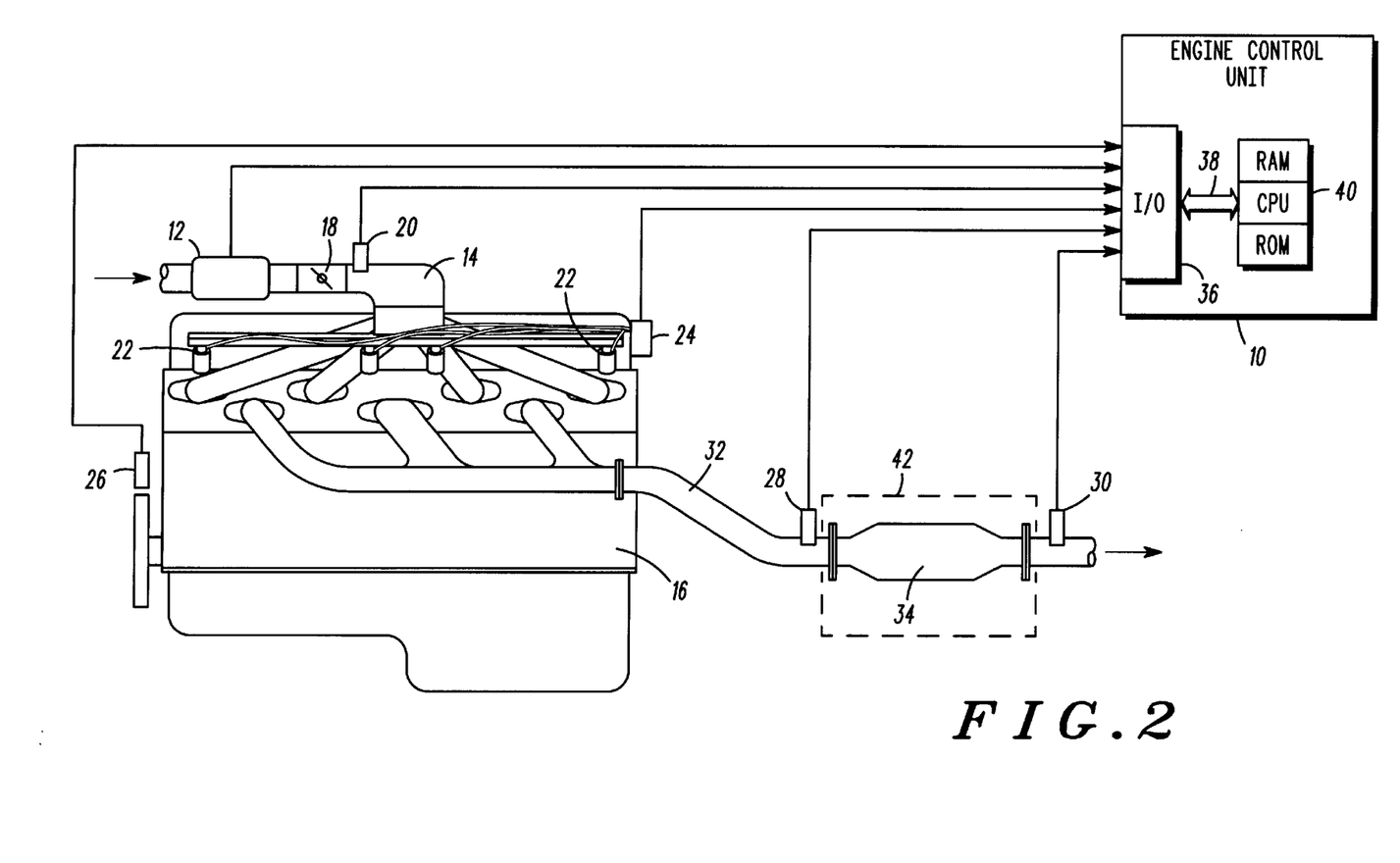
FIG. 2 is a schematic diagram of a catalyst control system arranged in accordance with the invention.

Shown in FIG. 2 is a schematic diagram of an internal combustion engine and an engine control unit configured in accordance with the invention. An engine control unit 10 receives air flow rate information from a mass air flow (MAF) sensor 12 (or, alternatively, an absolute pressure sensor 20) positioned upstream of an intake manifold 14 coupled to an engine 16. A throttle 18 is also mounted upstream of intake manifold 14. Air entering intake manifold 14 flows to engine 16 past fuel injectors 22. An injector driver 24 is electrically coupled to engine control unit 10. Crank shaft a position and engine speed information are relayed to engine control unit 10 by an engine sensor 26.

An upstream exhaust gas sensor 28 is mounted within an exhaust system 32. Exhaust gas sensor 28 can be a switch type binary heated exhaust gas oxygen (HEGO) sensor that provides a voltage output sufficient to determine whether or not the exhaust gas is rich or lean of stoichiometry. Alternatively, exhaust gas sensor 28 can be a universal exhaust gas oxygen (UEGO) sensor that provides a voltage output proportional to the current exhaust air/fuel ratio. A downstream exhaust gas sensor 30 is also mounted to exhaust system 32. Downstream exhaust gas sensor 30 provides a measure of total hydrocarbon concentration and methane concentration in the exhaust gas passing through exhaust system 32. Exhaust system 32 further includes a catalytic converter 34 positioned intermediate to upstream and downstream gas sensors 28 and 30, respectively.

It is important to note that a different upstream exhaust gas sensor could be utilized without departing from the invention. Furthermore, downstream exhaust gas sensor 30 can be either a simple methane-only sensor, or a combination sensor, which provides both methane concentration and some other constituent concentration. In a preferred embodiment of the invention, the downstream gas sensor 30 detects non-methane hydrocarbon concentrations in addition to methane.

Engine control unit 10 receives and transmits electrical signals through an I/O port 36. I/O port 36 is electrically coupled to control circuitry and storage registers by a data bus 38. All data storage, signal modulation, and computational procedures performed by the present invention are carried out by engine control unit 10 utilizing conventional circuit elements, such as a central processing unit, random access memory registers, read only memory registers, and the like. These elements are generally depicted as element 40 within engine control unit 10.

The computational approach for the catalyst control method of the invention defines a control volume 42 around the catalyst and monitors the flow of exhaust gases into and out of catalytic converter 34. Those of ordinary skill in the art will appreciate that, at pseudo steady state operating conditions, the catalytic converter 34 operates at maximum conversion efficiency when the amount of hydrocarbons detected by the downstream gas sensor 30 is approximately zero. This means that hydrocarbon and carbon monoxide conversion efficiencies are near maximum. At maximum NOx conversion efficiency the catalyst has depleted of its stored oxygen. It is important to note that the reduction of NO in a 3-way catalyst is through its reaction with CO, H2, and HC to form CO2, H2O, and N2, the ceria in the catalyst also accounts for a significant amount of O2 available for CO oxidation; however, this mechanism is also enhanced by the presence of precious metals.

Many systems described in the prior art suffer from an inability to predict the depletion of catalyst oxygen storage capacity before the regulated conversion efficiencies degrade. In the present invention, the problem of predicting catalyst oxygen depletion in catalytic converter 34 without causing a hydrocarbon breakthrough is solved by observing exhaust gas methane concentration. A rise in post-catalyst methane concentration is a leading indicator of catalyst non-methane hydrocarbon breakthrough. As the pre-catalyst gas goes from lean ($\lambda>1$) to rich ($\lambda<1$) the post-catalyst gas remains at $\lambda=1$ for an amount of time which is a function of the catalyst oxygen storage capacity and the flow rate of oxygen into the catalyst. The delay in the post catalyst λ holding at one (stoichiometry) and then returning to the precatalyst AFR is due to oxygen being released from the catalyst. The post-catalyst concentration of the hydrocarbons other than methane increases at the same time as the catalyst oxygen depletes (precatalyst and post-catalyst AFR match). The post-catalyst methane concentration, however, increases a short time before the catalyst oxygen depletes. Thus, the post-catalyst methane concentration serves as a leading indicator of catalyst oxygen depletion and impending breakthrough of non-methane hydrocarbons and carbon monoxide.

The reason that methane is the first hydrocarbon to reach a downstream exhaust gas sensor 30 is that the reactivity of methane is extremely low (due to the chemical stability of methane's tetrahedral structure). As methane is currently an unregulated exhaust gas hydrocarbon, using methane as a leading indicator of non-methane hydrocarbon breakthrough allows one to avoid hydrocarbon breakthroughs with no emissions penalty with regard to current and proposed future regulations. As catalyst hydrocarbon conversion efficiency deteriorates, the first constituent to pass through the catalyst is methane with its low reactivity. Therefore, a sudden rise in methane concentration as measured by downstream exhaust gas sensor 30 indicates a pending rise in regulated hydrocarbon breakthrough. Once an impending breakthrough is detected, the normalized air/fuel ratio can be biased so as to partially fill the catalyst with stored oxygen, thus avoiding the impending breakthrough without an increase in regulated emissions.

The use of a methane signal in the present invention represents an advantage over systems of the prior art, because they typically require a breakthrough in regulated hydrocarbons before a correction to the air/fuel ratio is commanded by the engine control unit 10. Note that a further advantage of the present invention is that it is not necessary to actively sense the concentration of nitrous oxides. This is because the catalyst is controlled for maximum conversion efficiency based on the precatalyst exhaust gas sensor 28 signal, the air flow measurement provided by MAF sensor 12 (or absolute pressure sensor 20), and the output of downstream exhaust gas sensor 30.

Figure 3:
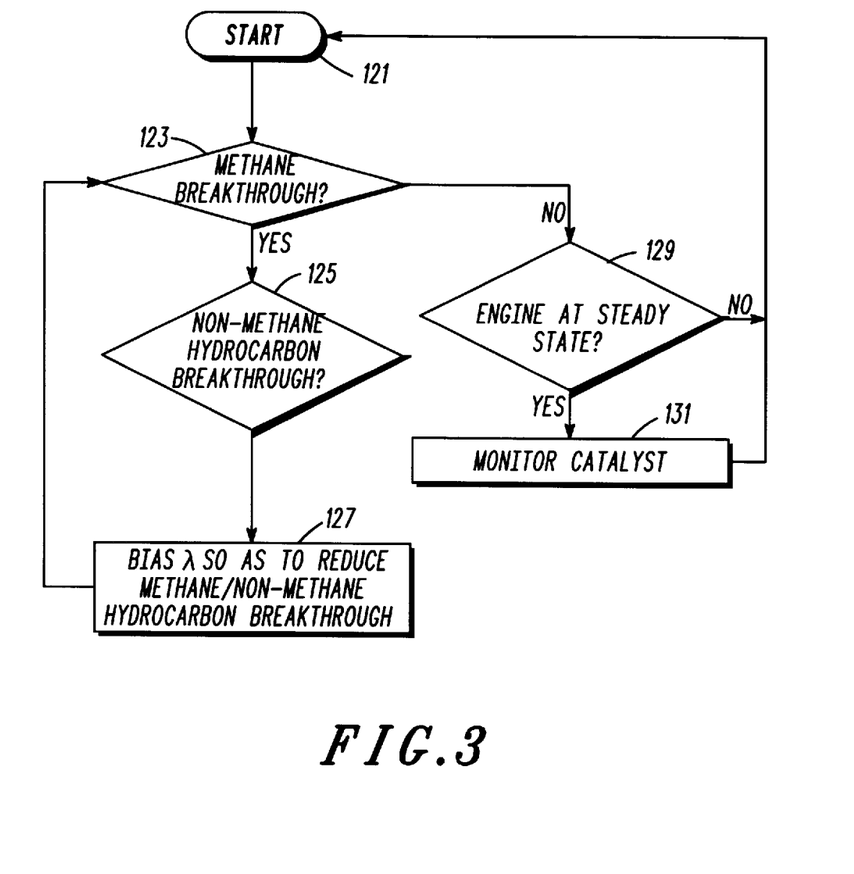
FIG. 3 illustrates a flow for monitoring and maintaining the conversion efficiencies of a catalyst in accordance with the invention.

FIG. 3 illustrates a flow for monitoring and maintaining the conversion efficiencies of a catalyst in accordance with the invention. The method begins at start step 121. Then, at step 123, the output voltage of downstream exhaust gas sensor 30 (indicative of a methane exhaust gas concentration) and the output voltage of MAF sensor 12 are read by engine control unit 10. A value of the methane exhaust flow is then calculated according to equation (1)

$$\text{methane exhaust flow} = \text{MAF}(1+1/\text{AFR})(\text{Mole weight methane}/\text{mole weight exhaust}) \text{ methane concentration} \quad (1)$$

The value of the calculated methane exhaust gas flow is then compared to a threshold value (which is indexed as a function of the engine operating condition). If the value of the calculated methane exhaust gas flow is greater than the threshold value, then a methane breakthrough event has occurred and a register internal to engine control unit 10 is set to indicate a methane breakthrough. If the value of the calculated methane exhaust gas flow is less than the threshold value, then a methane breakthrough event has not occurred and a register internal to engine control unit 10 is set to indicate that a methane breakthrough has not occurred. If a methane breakthrough has not occurred, control is transferred to step 129. If a methane breakthrough has occurred at step 123, then process control is passed to step 125.

In step 125, the output voltage of downstream exhaust gas sensor 30 (indicative of a hydrocarbon exhaust gas concentration) and the output voltage of MAF sensor 12 are read by engine control unit 10 and a total hydrocarbon exhaust gas flow is calculated. The calculation can be carried out using equation (1) and substituting the total non-methane hydrocarbon concentration for the methane concentration. A value for the non-methane hydrocarbon exhaust gas flow is then obtained by subtracting the value of the methane exhaust gas flow from the total hydrocarbon exhaust gas flow. The value of the calculated non-methane hydrocarbon exhaust gas flow is then compared to a threshold value (which is indexed as a function of the engine operating condition). If the value of the calculated non-methane hydrocarbon exhaust gas flow is greater than the threshold value, then a hydrocarbon breakthrough event has occurred and a register internal to engine control unit 10 is set to indicate a non-methane hydrocarbon breakthrough. If the value of the calculated non-methane hydrocarbon exhaust gas flow is less than the threshold value, then a non-methane hydrocarbon breakthrough event has not occurred and a register internal to engine control unit 10 is set to indicate that a non-methane hydrocarbon breakthrough has not occurred. Program control is then transferred to step 127.

In step 127, the feedgas normalized air/fuel ratio is biased to the lean side (excess air is added to the feedgas mixture) in order to increase the hydrocarbon conversion efficiency of catalytic converter 34. Note that this bias may be calculated in any number of ways by one of ordinary skill in the art. In a preferred embodiment, a temporary bias is added to the desired closed-loop setpoint for the upstream exhaust gas sensor 28 feedback controller for an amount of time dependent on the mass flow rate of air through the engine, and the type of breakthrough which has occurred. For methane only breakthroughs, the closed loop setpoint is biased only slightly. It will be recalled that for methane breakthroughs the methane breakthrough register is set to true in step 123, while the non-methane hydrocarbon breakthrough register is set to false in step 125. Alternatively, for non-methane hydrocarbon breakthroughs, the closed loop setpoint is biased a larger amount due to the more urgent nature of the controller error. It will be recalled that for non-methane hydrocarbon breakthroughs the non-methane hydrocarbon breakthrough register is set to true in step 125.

One of ordinary skill in the art will recognize that the amount of bias can be calculated with a closed loop controller such as a PID controller without departing from the fundamental teaching of this embodiment. Also, it is important to note that the magnitude of the bias must be carefully limited so as to not impact the nitrous oxides conversion efficiency of catalytic converter 34, or so as to adversely impact driveability as perceived by the operator.

After completing step 127, program control is then transferred back to step 123. If a methane breakthrough has not occurred in step 123, control is transferred to step 129. In step 129, a determination is made as to whether or not the engine operating condition is sufficiently stable to permit accurate catalyst monitoring. The determination is made by examining certain descriptive statistics of the engine operating condition, such as the variance of engine rpm and manifold pressure, and comparing these calculated values to threshold values. If the calculated values are below the threshold values, then the engine is assumed to be in steady state and process control is transferred to step 131. If the calculated values are above the threshold values, then the engine is assumed to be in a transient condition, and program control is transferred to step 121. In step 131, the hydrocarbon conversion efficiency of catalytic converter 34 is calculated. Program control is then transferred back to step 121.

Figure 4:
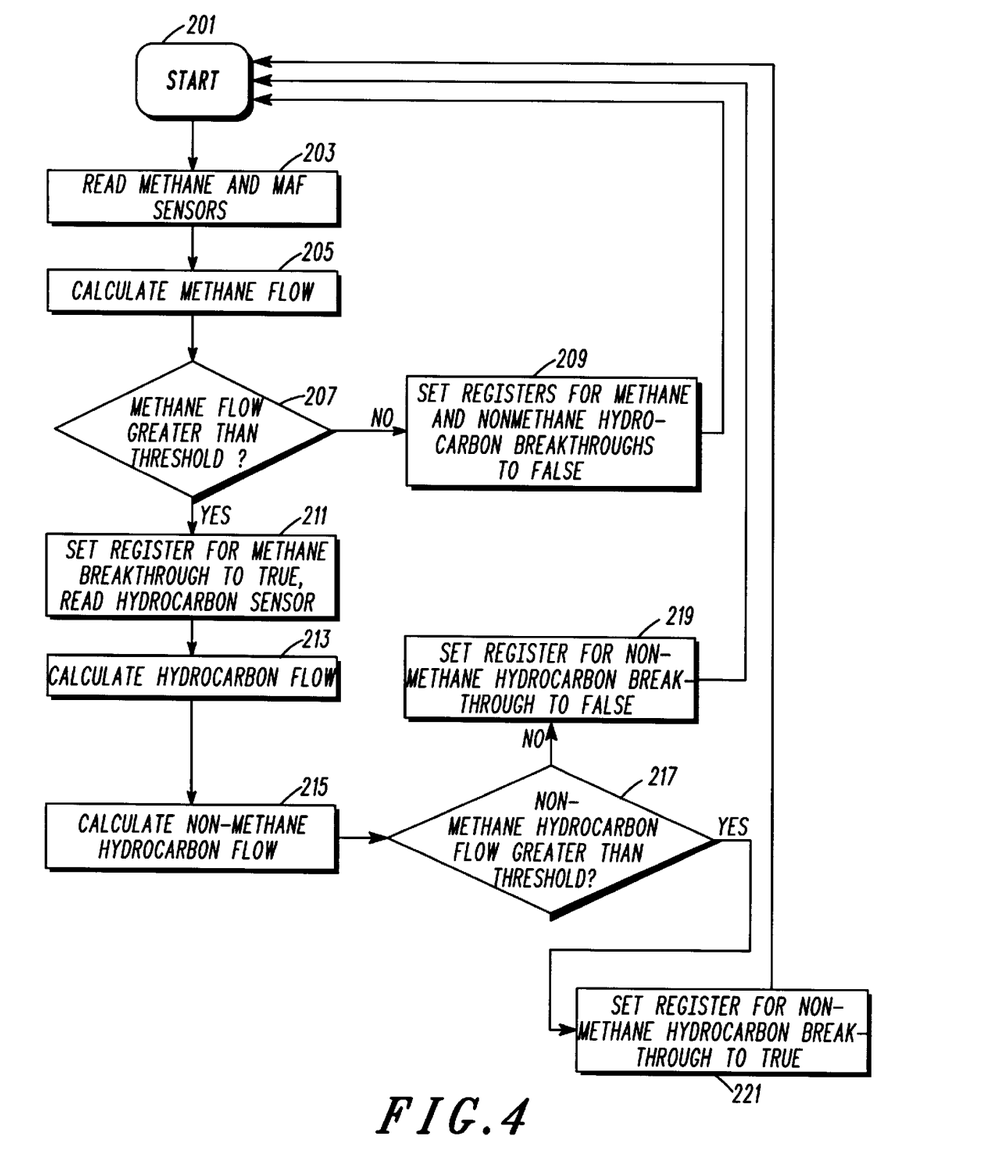
FIG. 4 illustrates a flow diagram for sensor signal processing in accordance with the invention.

FIG. 4 illustrates a flow diagram for sensor signal processing in accordance with the invention (steps 123 and 125 in FIG. 2). Note that in the preferred embodiment the mathematical computations are performed internally to engine control unit 10, and that other equivalent methods for performing the computations can be used. For example, a dedicated integrated circuit could be employed without departing from the method of the invention.

The sensor signal processing begins at start step 201. Control is then passed to step 203, where the output voltage of downstream exhaust gas sensor 30 (indicative of a methane exhaust gas concentration) and the output voltage of MAF sensor 12 are read by engine control unit 10. Control unit 10 then executes step 205, wherein a methane exhaust gas flow is calculated in accordance with equation (1). Control is then passed to program step 207, where the value of the calculated methane exhaust gas flow is compared to a threshold value (which is indexed as a function of the engine operating condition). If the value of the calculated methane exhaust gas flow is greater than the threshold value, then a methane breakthrough event has occurred and control is passed to step 211, wherein a register internal to engine control unit 10 is set to indicate a methane breakthrough and also wherein the output voltage of downstream exhaust gas sensor 30 (indicative of a hydrocarbon exhaust gas concentration) is read by engine control unit 10. Program control is then transfers to step 213.

In step 213, a total hydrocarbon exhaust gas flow is calculated and program control is then passed to step 215. In step 215, a value for the non-methane hydrocarbon exhaust gas flow is obtained by subtracting the value of the methane exhaust gas flow from the total hydrocarbon exhaust gas flow. Control is then passed to step 217. In step 217, the value of the calculated non-methane hydrocarbon exhaust gas flow is compared to a threshold value (which is indexed as a function of the engine operating condition). If the value of the calculated non-methane hydrocarbon exhaust gas flow is greater than the threshold value, then a hydrocarbon breakthrough event has occurred and step 221 is executed, where a register internal to engine control unit 10 is set to indicate a non-methane hydrocarbon breakthrough. Program control then returns to start step 201. If, during the execution of step 217, the value of the calculated non-methane hydrocarbon exhaust gas flow is less than the threshold value, then a non-methane hydrocarbon breakthrough event has not occurred and step 219 is executed, where a register internal to engine control unit 10 is set to indicate that a non-methane hydrocarbon breakthrough has not occurred. Program control is then transferred to start step 201. Also, during the execution of step 207, if the value of the calculated methane exhaust gas flow is less than the threshold value, program control is transferred to step 209. A register internal to engine control unit 10 is set to indicate that a methane breakthrough has not occurred, and that a non-methane hydrocarbon breakthrough has not occurred. Control is then returned to start step 201.

Figure 5:
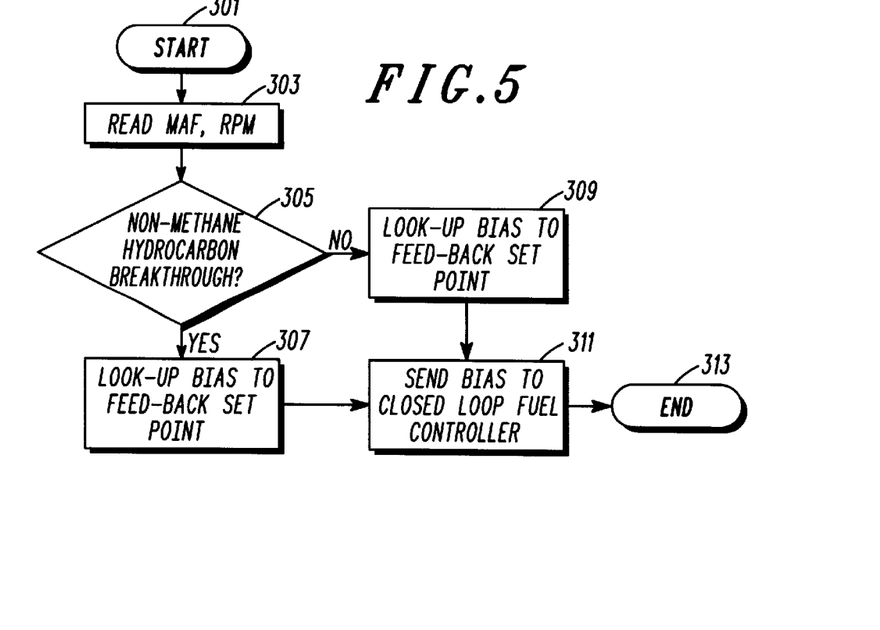
FIG. 5 illustrates a flow diagram for modifying the closed loop feedback fuel controller set point in accordance with the invention.

FIG. 5 illustrates a flow diagram for controlling the catalyst feedgas AFR (step 127 in FIG. 2) in order to maximize catalyst conversion efficiencies in accordance with the invention. The program begins at start step 301. Control is passed to step 303, wherein engine control unit 10 reads the output voltage of MAF sensor 12 and calculates engine speed (RPM) from the output of engine sensor 26. Control is then passed to step 305.

In step 305, the presence or absence of a non-methane hydrocarbon breakthrough is determined by reading the proper register in engine control unit 10. If the register contents indicates the presence of a non-methane hydrocarbon breakthrough, then control is passed to step 307. During the execution of step 307, the engine control unit 10 utilizes an internal look-up table of calibrated biases stored as functions of the engine operating condition to determine the proper bias to apply to the feedback controller set point. The bias results in the reduction of fuel in the air/fuel mixture, which causes the air/fuel ratio in the feedgas to become more lean. In this case, the magnitude of the bias will be relatively large, since a non-methane hydrocarbon breakthrough has been detected. Note that in a preferred embodiment, the engine operating condition is determined by indexing the look-up table as a function of engine mass air flow and engine rpm. Other engine operating variables, such as manifold absolute pressure or engine coolant temperature, could be utilized in defining the engine operating condition without departing from the invention. Control is then passed to program step 311.

During the execution of step 305, if the register internal to control unit 10 is read and the result indicates the absence of a non-methane hydrocarbon breakthrough, control passes to step 309. In step 309, the engine control unit 10 utilizes an internal look-up table of calibrated biases stored as functions of the engine operating condition to determine the proper bias to apply to the feedback controller set point. In this case, a non-methane hydrocarbon breakthrough has not been detected. Accordingly, the amount of bias to produce a leaner air/fuel ratio in the feedgas is less than that applied during execution of step 307 above. This means that less fuel is removed from the air/fuel mixture when detecting only methane, as compared to the situation where non-methane hydrocarbons are detected. Also, in a preferred embodiment the engine operating condition is determined by indexing the look-up table as a function of engine mass air flow and engine rpm. Other engine operating variables, such as manifold absolute pressure or engine coolant temperature, could be utilized in defining the engine operating condition without departing from the invention. Control is then transferred to program step 311.

In step 311, the bias to the feedback controller determined in step 307 or 309 is sent to the engine closed-loop feedback fuel controller (also internal to engine control unit 10). The integration of such a set point bias into existing feedback fuel control strategies is known in the art. Once step 311 has been executed, program control is transferred to end step 313.

Note that control system performance can be improved by adding a downstream HEGO sensor or downstream NOx sensor in addition to downstream exhaust gas sensor 30. These sensors can be used to detect the presence of lean exhaust gases and a feedback correction made to the air/fuel ratio in order to limit NOx breakthrough.

Figure 6:
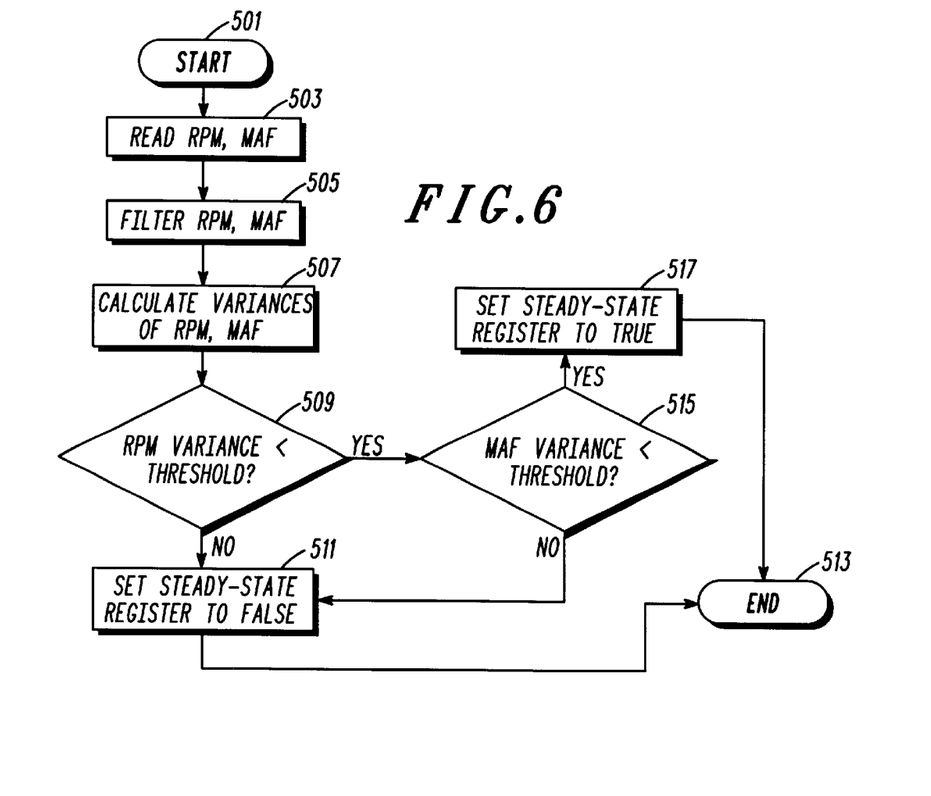
FIG. 6 illustrates a flow diagram in accordance with the invention for determining the operating state of an engine.

FIG. 6 illustrates a flow diagram for determining the operating state of an engine (step 129 in FIG. 3). After the execution of start step 501, control is transferred to step 503, where engine control unit 10 reads the output voltage of MAF sensor 12 and calculates engine speed (RPM) from the output of engine sensor 26. In step 505, the MAF sensor signal and calculated rpm are bandpass filtered in order to remove the effect of high frequency noise on the signals. Program control is then transferred to step 507, where the variances of the last n engine rpm and MAF signals are calculated, where n is an arbitrary number. For purposes of the preferred embodiment, n is set to a value, such that the calculated variances correlate with the last 10 engine cycles. Control is then transferred to step 509, where the calculated engine rpm variance is compared to a threshold value. If the calculated engine rpm variance is not less than the rpm variance threshold value, then program control is transferred to step 511, where a register internal to engine control unit 10 is set to false and program control is transferred to end step 513. If the calculated engine rpm variance is less than the rpm variance threshold value, program control is transferred to program step 515, where the calculated MAF variance is compared with a MAF variance threshold value.

During the execution of step 515, if the calculated MAF variance is not less the MAF variance threshold value, then program control is transferred to step 511, where a register internal to engine control unit 10 is set to false and program control is transferred to end step 513. If, during the execution of step 515, the calculated MAF variance is less than the MAF variance threshold value, then program control is transferred to step 517. During the execution of step 517, a register internal to engine control unit 10 is set to true and program control is transferred to end step 513.

Figure 7:
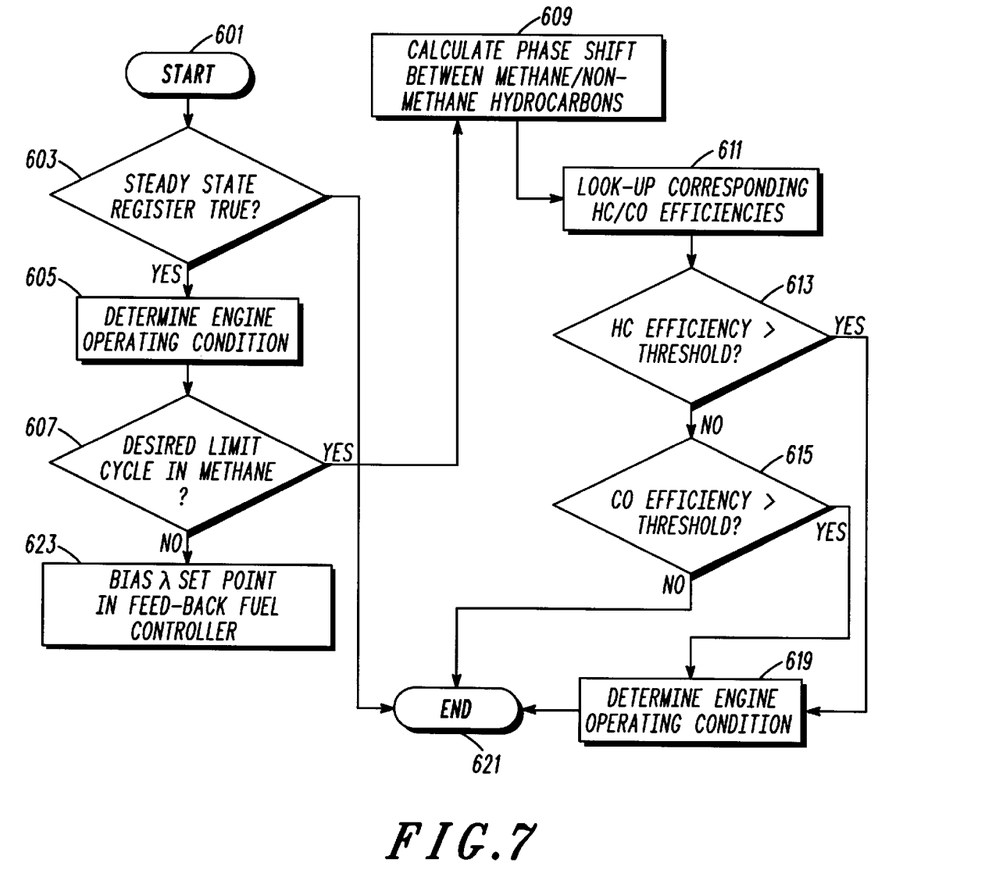
FIG. 7 illustrates a flow diagram in accordance with the invention for determining the hydrocarbon and carbon monoxide conversion efficiencies for a catalytic converter.

FIG. 7 illustrates a flow diagram for monitoring the catalyst to determine the hydrocarbon and carbon monoxide conversion efficiencies for catalytic converter 34 (step 131 in FIG. 3). The program commences at start step 601. Program control is then transferred in step 603, where the engine control unit 10 determines the state of an internal register used to indicate whether or not the engine is operating in a steady-state operating mode. If the register is set to false, indicating that the engine is not currently operating in a steady state mode, control is transferred to end step 621, ending program execution. Alternatively, if the register is set to true, program control is transferred to step 605, where the previously obtained value of filtered engine rpm and MAF are used to determine the engine operating condition. Other engine operating variables, such as manifold absolute pressure or engine coolant temperature, could be utilized in defining the engine operating condition without departing from the invention. Control is then passed to program step 607.

During the execution of step 607, the current magnitude and frequency of the exhaust gas post catalyst methane limit cycle is compared with a look-up table of desired values indexed as functions of engine operating conditions. It is important to note that in the preferred embodiment it is assumed that the upstream exhaust gas sensor 28 is a switch type HEGO, which automatically results in a limit cycle behavior in the precatalyst and in the post catalyst methane concentration. If the post catalyst methane limit cycle characteristics do not match the desired characteristics, then program control is transferred to step 623. In step 623, a temporary bias is added to the desired closed loop setpoint for the upstream exhaust gas sensor 28 feedback controller for an amount of time dependent on the mass flow rate of air through the engine and the engine speed. Note that this bias may be calculated in any number of ways by one of ordinary skill in the art. Control is then transferred to step 603.

During the execution of step 607, if the post catalyst methane limit cycle characteristics do match the desired characteristics within a specified tolerance, then program control is transferred to step 609. During the execution of step 609, the phase shift between the methane and non-methane hydrocarbon limit cycles is calculated by measuring the time period between the peaks in the methane limit cycle and the corresponding peaks in the non-methane hydrocarbon limit cycle. Program control is then transferred to step 611. In step 611, the hydrocarbon and carbon monoxide conversion efficiencies for catalytic converter 34 are determined by using a look-up table indexed as a function of engine rpm, MAF, and the phase shift is calculated in step 609. This look-up table is established a priori.

The resulting hydrocarbon conversion efficiency is compared with a threshold value in step 613. If, during the execution of step 613, the hydrocarbon conversion efficiency is greater than the threshold value, program control is transferred to step 619, where a Malfunction Indicator Light (MIL) is activated by engine control unit 10. Program control is then transferred to end step 621. Alternatively, if the hydrocarbon conversion efficiency is less than or equal to the threshold value, program control is transferred to step 615, where the carbon monoxide conversion efficiency determined in step 611 is compared with a threshold value. If the carbon monoxide conversion efficiency is greater than a threshold value, program control is transferred to step 619, where a Malfunction Indicator Light (MIL) is activated by engine control unit 10. Program control is then transferred to end step 621. During the execution of step 615, if the carbon monoxide conversion efficiency determined in step 611 is less than or equal to the threshold value, program control is transferred to end step 621.

It is important to note that the preferred embodiment is designed to meet the currently pending regulations, which require the activation of the MIL when detecting a single failure. If this requirement should be relaxed, benefits could be realized by statistically analyzing a series of tests on-line in order to determine the probability of a catalyst failure, and the MIL would only be activated if the probability of a catalyst failure were above a specified threshold value.

Thus it is apparent that there has been provided, in accordance with the invention, a method for monitoring and controlling the performance of a catalytic converter utilizing post catalyst methane measurements, which fully meets the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, difference circuit arrangements can be provided to carry out the necessary computations. It is therefore intended to include within the invention all such variations and modifications as fall within the scope of the appended claims and equivalents thereof.

We claim:

1. A method for monitoring and controlling the performance of a catalytic converter comprising the steps of:

detecting the presence of methane in an exhaust gas stream exiting the catalytic converter;

detecting the presence of a plurality of non-methane hydrocarbons in the exhaust gas stream exiting the catalytic converter;

measuring a phase shift between methane and the plurality of non-methane hydrocarbons;

determining a hydrocarbon conversion efficiency;

comparing the hydrocarbon conversion efficiency with pass/fail criteria to determine an operational status of the catalytic converter; and outputting the operational status to an operator display.

2. The method of claim 1, wherein the step of measuring a phase shift comprises the steps of:

continuously determining a concentration of methane and a total concentration of the plurality of non-methane hydrocarbons over a predetermined time interval;

determining a maximum concentration of methane and designating a first time mark;

determining a maximum concentration of the plurality of non-methane hydrocarbons and designating a second time mark; and determining the difference between the first time mark and the second time mark.

3. The method of claim 1, wherein the step of comparing the hydrocarbon conversion efficiency with pass/fail criteria comprises the step of comparing the difference between the first time mark and the second time mark with a reference time standard.

4. A method for monitoring and controlling the performance of a catalytic converter comprising the steps of:

analyzing an exhaust gas stream exiting the catalytic converter for the presence of methane and non-methane hydrocarbons;

adjusting an air/fuel ratio in the exhaust gas stream when methane is detected;

measuring a phase shift between methane and the non-methane hydrocarbons;

using the phase shift to determine a hydrocarbon conversion efficiency of the catalytic converter;

comparing the hydrocarbon conversion efficiency with pass/fail criteria; and outputting a status signal to a display device.

5. The method of claim 4, wherein the step of measuring a phase shift comprises the steps of:

continuously determining a concentration of methane and a total concentration of a plurality of non-methane hydrocarbons over a predetermined time interval;

determining a maximum concentration of methane and designating a first time mark;

determining a maximum concentration of the plurality of non-methane hydrocarbons and designating a second time mark; and determining the difference between the first time mark and the second time mark.

6. The method of claim 5, wherein the step of using the phase shift comprises the step of comparing the difference between the first time mark and the second time mark with a reference standard.

7. The method of claim 4, wherein the step of adjusting an air/fuel ratio comprises changing the fuel concentration in the exhaust gas stream to increase an oxygen storage level of a catalyst within the catalytic converter.

8. A method for monitoring and controlling the performance of a catalytic converter comprising the steps of:

monitoring an exhaust gas stream exiting the catalytic converter for a methane signal;

upon detecting the methane signal, determining an oxygen storage level of a catalyst within the catalytic converter;

comparing the oxygen storage level with a reference standard; and continuously adjusting an air/fuel ratio in the exhaust gas stream to maintain the oxygen storage level within predetermined control limits.

9. A method for monitoring and controlling the performance of a catalytic converter comprising the steps of:

monitoring an exhaust gas stream exiting the catalytic converter for a methane signal:

upon detecting the methane signal determining an oxygen storage level of a catalyst within the catalytic converter;

comparing the oxygen storage level with a reference standard;

continuously adjusting an air/fuel ratio in the exhaust gas stream to maintain the oxygen storage level within predetermined control limits;

monitoring the exhaust gas stream exiting the catalytic converter for a selected species within a of plurality of non-methane hydrocarbons;

measuring a phase shift between methane and the selected species;

using the phase shift to determine a hydrocarbon conversion efficiency of the catalytic converter;

comparing the hydrocarbon conversion efficiency with pass/fail criteria; and outputting a status signal to a display device.

10. The method of claim 9, wherein the step of measuring a phase shift comprises the steps of:

continuously determining a concentration of methane and a total concentration of a plurality of non-methane hydrocarbons over a predetermined time interval;

determining a maximum concentration of methane and designating a first time mark;

determining a maximum concentration of the plurality of non-methane hydrocarbons and designating a second time mark; and determining the difference between the first time mark and the second time mark.

11. A method for monitoring and controlling the performance of a catalytic converter comprising the steps of:

controlling the air/fuel ratio of a feedgas entering an engine;

monitoring an exhaust gas stream exiting the catalytic converter for the presence of methane; and upon detecting methane, reducing a fuel level in the feedgas to make the feedgas more lean.

12. The method of claim 11 further comprising monitoring the exhaust gas stream for the presence of non-methane hydrocarbons.

13. The method of claim 11, wherein the step of detecting methane comprises the steps of:

calculating a concentration of methane in the exhaust gas stream; and comparing the concentration of methane to a predetermined threshold value.

14. A method for monitoring and controlling the performance of a catalytic converter comprising the steps of:

controlling the air/fuel ratio of a feedgas entering an engine;

monitoring an exhaust gas stream exiting the catalytic converter for the presence of methane;

upon detecting methane, reducing a fuel level in the feedgas to make the feedgas more lean;

monitoring the exhaust gas stream for the presence of non-methane hydrocarbons:

upon detecting only methane, removing a first amount of fuel from the feedgas; and upon detecting non-methane hydrocarbons, reducing a second amount of fuel from the feedgas, wherein the second amount of fuel is greater than the first amount of fuel.

15. A method for monitoring and controlling the performance of a catalytic converter comprising the steps of:

controlling the air/fuel ratio of a feedgas entering an engine;

monitoring an exhaust gas stream exiting the catalytic converter for the presence of methane;

upon detecting methane, reducing a fuel level in the feedgas to make the feedgas more lean:

monitoring the exhaust gas stream for the presence of non-methane hydrocarbons;

calculating a phase shift between methane and the non-methane hydrocarbons;

determining a conversion efficiency of the catalytic converter;

comparing the conversion efficiency with a threshold value; and activating an alarm whenever the conversion efficiency is less than the threshold value.

* * * * *